May 10, 1932.  G. MOLDOVAN ET AL  1,857,734
SUGAR DISPENSING CONTAINER
Filed Dec. 31, 1930   2 Sheets-Sheet 1
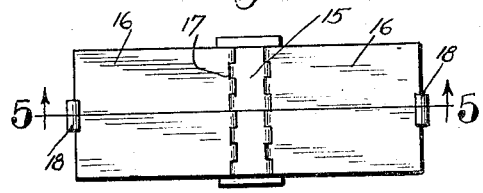
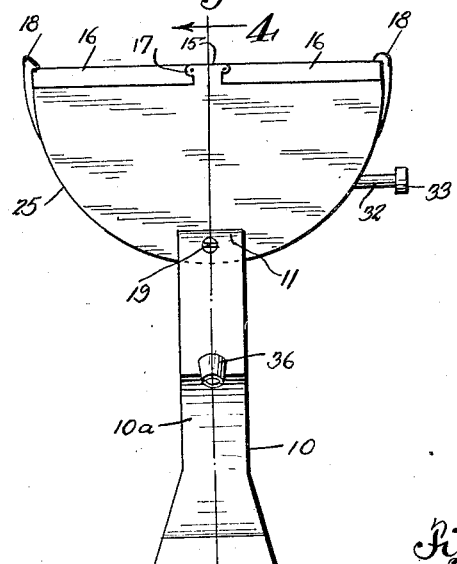
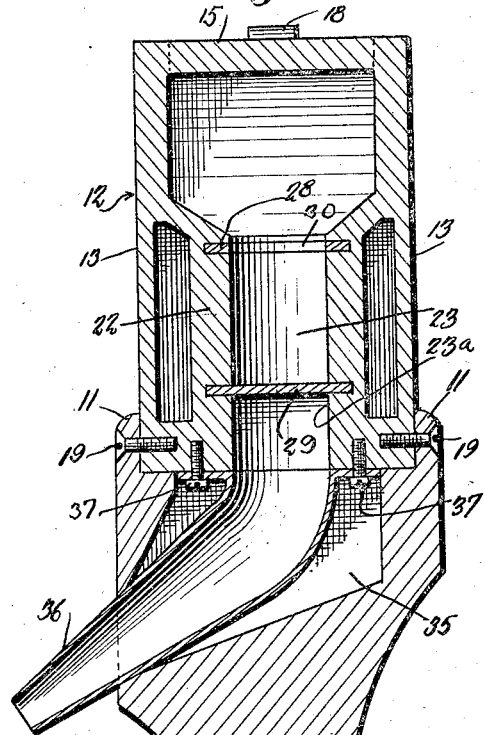
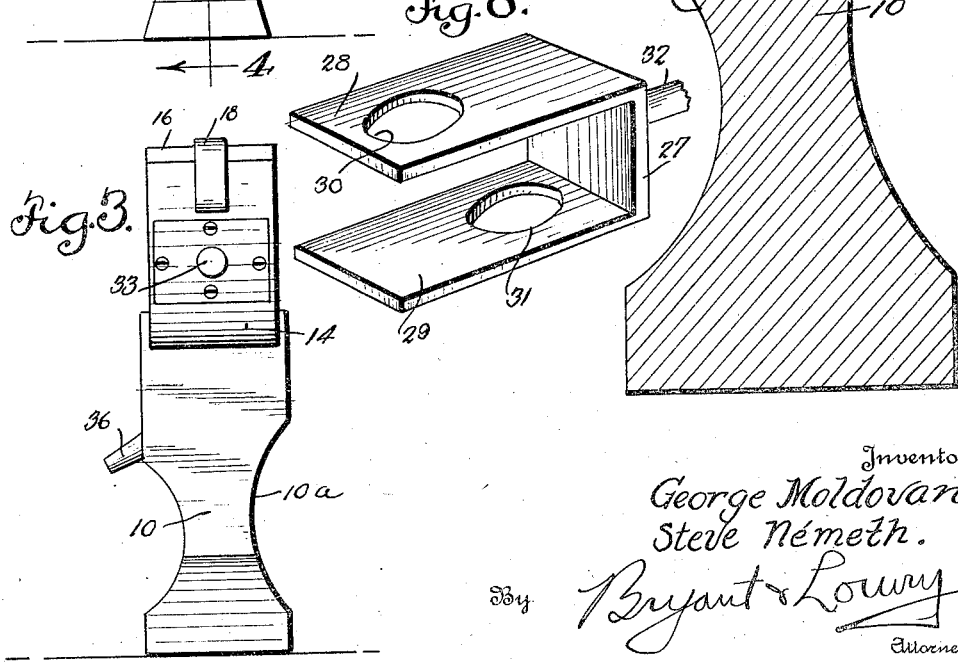
Inventors.
George Moldovan &
Steve Németh.
By Bryant & Lowry
Attorneys

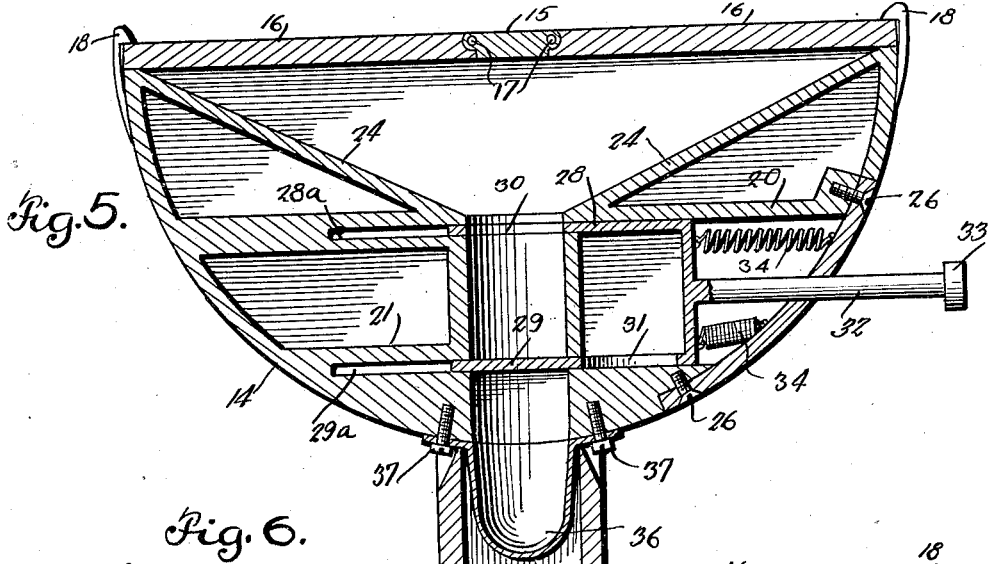
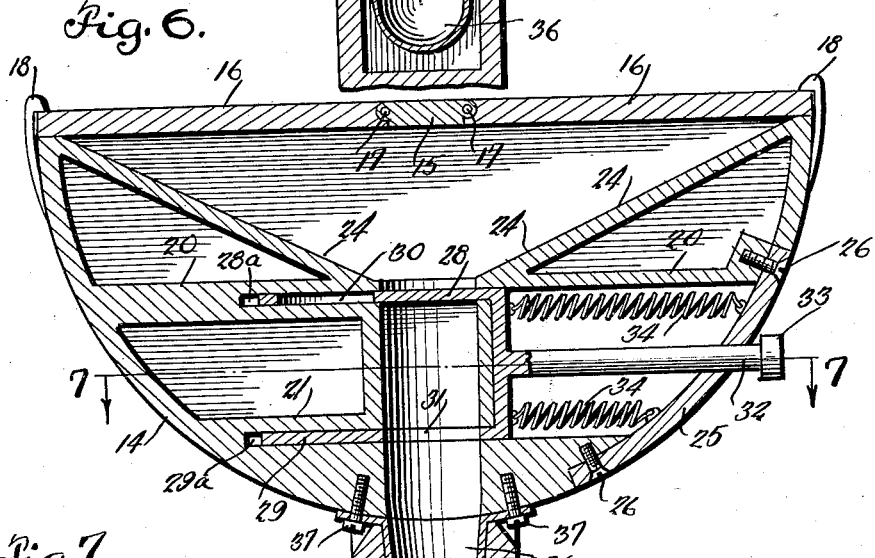
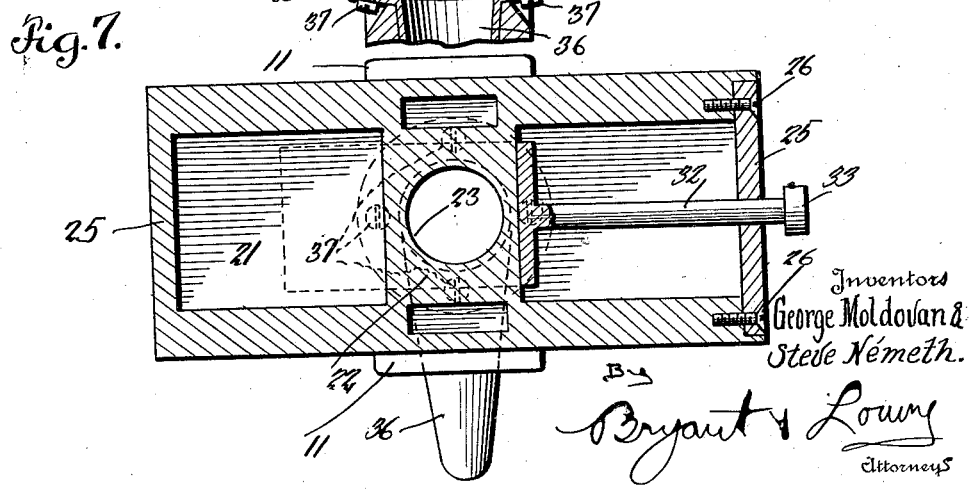

Patented May 10, 1932

1,857,734

UNITED STATES PATENT OFFICE

GEORGE MOLDOVAN, OF MEADOW LANDS, AND STEVE NÉMETH, OF WASHINGTON, PENNSYLVANIA

SUGAR DISPENSING CONTAINER

Application filed December 31, 1930. Serial No. 505,864.

This invention relates to certain new and useful improvements in sugar dispensing container.

The primary object of the invention is to provide a sugar dispensing container of a type adapted for home use wherein a predetermined quantity of sugar, such as a teaspoon full is dispensed at each operation of the device, the container being so designed that a cup or other receptacle may be positioned relative to the container to receive the discharged sugar.

With the above and other objects in view that will become apparent as the nature of the invention is better understood, the same consists in the novel form, combination and arrangement of parts hereinafter more fully described, shown in the accompanying drawings and claimed.

In the drawings:

Figure 1 is a top plan view of a sugar dispensing container constructed in accordance with the present invention and showing hinged cover sections at the upper side of the container to facilitate the charging of the latter with sugar;

Figure 2 is a front elevational view of the container showing the push rod for operating the interior mechanism controlling the dispensing of sugar, and the discharge spout;

Figure 3 is a side elevational view;

Figure 4 is an enlarged vertical cross-sectional view taken on line 4—4 of Figure 2 showing the push rod operated valve plate for measuring and controlling the dispensing of sugar, the upper hopper and the lower discharge chute;

Figure 5 is a vertical longitudinal sectional view, taken on line 5—5 of Figure 1, showing the tensioned valve plate separating the hopper from the discharge chute and the push rod attachment for the valve plate;

Figure 6 is a sectional view, similar to Figure 5, showing the valve plates in shifted position against the tension of the springs engaged therewith for the dispensing of a predetermined quantity of sugar;

Figure 7 is a horizontal sectional view taken on line 7—7 of Figure 6; and

Figure 8 is a fragmentary perspective view of the sugar dispensing valve plate.

Referring more in detail to the accompanying drawings, there is illustrated a sugar dispensing container designed for dispensing predetermined quantities of sugar at each operation thereof, the container comprising a supporting base 10 provided with a seat at its upper end formed by front and rear upstanding flanges 11 and between which flanges the sugar receptacle 12 is received, the receptacle 12 comprising parallel side walls 13, a curved bottom wall 14 and a flat top wall comprising a center bridge strip 15 midway the ends of the receptacle and to which doors 16 are hinged as at 17, the outer free ends of the doors 16 being retained in closed position by spring clips 18. The receptacle 14 is retained in position upon the supporting base 10 by anchoring screws 19 as shown in Figure 4.

The interior construction of the receptacle 12 includes spaced partitions 20 and 21 as shown in Figures 5 and 6 and a central block 22 having a measuring pocket 23 therein that is in communication with the upper part of the receptacle 12 and into which sugar is directed by the inclined walls 24 disposed above the partition 20.

One side portion of the curved bottom 14 of the receptacle is provided with an opening that is closed by the cover wall 25 retained in position by the screws 26 to facilitate positioning of the valve device shown in Figure 8 in the receptacle. The valve device includes an end wall 27 that has projecting from one side thereof at its upper and lower edges, parallel plates 28 and 29 respectively, the plates 28 and 29 being provided with offset openings 30 and 31. The partition 20 is provided with a groove 28a to receive the valve plate 28 while the partition 21 is provided with a groove 29a to receive the valve plate 29. The end wall 27 of the valve device carries an operating push rod 32 projecting through the cover wall 25 and having an operating handle 33 upon its outer end while coil springs 34 are anchored to at ends to the cover wall 25 and end wall 27 of the valve device for normally holding the valve device in the position shown in Figure 5.

The upper end of the base portion 10 is provided with a cut-away portion 35 having a lateral outlet, the discharge spout 36 is attached as at 37 to the lower side of the receptacle 12 being positioned in the cut away portion 35 and projecting through the lateral outlet as shown in Figure 4. The block 22 having the pocket 23 therein is provided with an opening 23a beneath the pocket that communicates with the spout 36.

From the above detailed description, it is believed that the construction and operation of the sugar dispensing container will at once be understood, it being noted that the forward side of the base 10 is provided with an incut portion 10a to permit the positioning of the cup or the like in position to receive the sugar to be discharged from the chute 36. Sugar or similar fluent material is placed in the receptacle 12 when the cover or walls 16 are open and the inclined partitions 24 direct the discharge of sugar into the pockets 23, the normal positions of the valve plates 28 and 29 being illustrated in Figure 5, wherein the valve device is illustrated as retracted by the springs 34. Upon operating the push rod 32 the plates 28 and 29 are moved into the grooves 28a and 29a respectively of the partition walls 20 and 21 against the tension of the springs 34, movement of the valve device being limited by the end wall 27 engaging the adjacent side of the block 22 as shown in Figures 6 and 7. The quantity of sugar in the pocket 23 is then delivered to the chute or spout 36, the valve opening 30 in the valve plate 28 being positioned laterally of the pocket as shown in Figure 6, for closing the communication between the upper part of the receptacle 12 and the pocket while the valve opening 31 in the lower valve plate 29 is moved into registration with the opening 23a in the lower end of the block 22 beneath the pocket 23, thus allowing a quantity of sugar confined in the pocket 23 to be discharged from the chute or spout 36. The provision of the grooves 28a and 29a in the block partitions 20 and 21 provides a substantial support and guide for the valve device while one side of the block 22 provides movement limiting means for the valve device. The springs 34 effect retracting of the valve when pressure on the push rod 32 is relieved.

While there is herein shown and described the preferred embodiment of the invention, it is nevertheless to be understood that minor changes may be made therein without departing from the spirit and scope of the invention as claimed.

We claim:

In a measuring and dispensing device, a receptacle having a bottom opening, a base support for the receptacle, a laterally directed spout carried by the base support in communication with the receptacle opening, a block forming an integral part of the receptacle and in which the opening is formed, said block having spaced grooves extending laterally of the block opening at one side and closed at their outer ends, a reciprocating valve device having spaced apertured plates and an end connecting wall with the wall normally engaged with the block when the valve device is in closed position to prevent flow of material from the receptacle into the block opening, said apertured plates being slidable in the block grooves, springs interposed between a wall of the receptacle and the outer side of the connecting wall of the valve device for urging the valve device to closed position and in operating pull rod for the valve device attached to the end connecting wall and extending through a wall of the receptacle and movable with the valve device in the direction of movement thereof.

In testimony whereof we affix our signatures.

GEORGE MOLDOVAN.
STEVE NÉMETH.